(12) United States Patent
Mateos

(10) Patent No.: US 8,663,592 B2
(45) Date of Patent: Mar. 4, 2014

(54) METHOD FOR PRODUCING VEGETABLE CARBON WITH HIGH CARBON CONTENT AND PLANT FOR CARRYING OUT SAID METHOD

(75) Inventor: David Mateos, Bordeaux (FR)

(73) Assignee: Areva Renouvelables, Courbevoie (FR)

( * ) Notice: Subject to any disclaimer, the term of this patent is extended or adjusted under 35 U.S.C. 154(b) by 815 days.

(21) Appl. No.: 12/529,234

(22) PCT Filed: Feb. 29, 2008

(86) PCT No.: PCT/FR2008/050349
§ 371 (c)(1),
(2), (4) Date: Jan. 4, 2010

(87) PCT Pub. No.: WO2008/116993
PCT Pub. Date: Oct. 2, 2008

(65) Prior Publication Data
US 2010/0111815 A1    May 6, 2010

(30) Foreign Application Priority Data

Mar. 1, 2007 (FR) .................................... 07 53581

(51) Int. Cl.
| F23G 5/12 | (2006.01) |
| F23G 5/00 | (2006.01) |
| F23G 7/00 | (2006.01) |
| B09B 3/00 | (2006.01) |
| C01B 31/00 | (2006.01) |
| C01B 31/02 | (2006.01) |

(52) U.S. Cl.
USPC ....... 423/445 R; 110/229; 110/248; 110/256; 110/235

(58) Field of Classification Search
None
See application file for complete search history.

(56) References Cited

U.S. PATENT DOCUMENTS 4,037,543 A    7/1977  Angelo
4,584,947 A *  4/1986  Chittick ........................... 48/76

(Continued)

FOREIGN PATENT DOCUMENTS

WO    9638515 A    12/1996
WO    2007000548 A    1/2007

OTHER PUBLICATIONS

Helsen L et al; "Total recycling of CCA treated wood waste by low-temperature pyrolysis," Waste Management, Oct. 1998, pp. 571-578, vol. 18, No. 6-8, Elsevier, New York, New York.

(Continued)

*Primary Examiner* — Guinever Gregorio
(74) *Attorney, Agent, or Firm* — Heslin Rothenberg Farley & Mestiti P.C.

(57) ABSTRACT

For implementing startup and priming phases of a vegetable carbon production method, an installation includes a generator of hot gases with low oxygen content, and a fan downstream which boosts the hot gases into a lower part of a reactor. The reactor includes a column of substantial height whose upper inlet, with a temperature T3 of less than 65° C., is used to continuously load and add biomass and whose lower part has a grid for support and removal of the load, an underlying injection chamber for the gases from the generator, and a mechanism for retrieving processed substances. The installation also includes, at the outlet for cold gases at temperature T3 at the top of the reactor column, a thermal post-combustion chamber for the extracted gases, a heat exchanger, a fan, a second heat exchanger, a vent and connecting pipes. Another circuit located between the reactor and the fan includes a compressor unit to supply pressurized air at ambient temperature in the production phase and to replace the hot gases from the generator by compressed air.

4 Claims, 5 Drawing Sheets

(56) References Cited

U.S. PATENT DOCUMENTS

| | | | |
|---|---|---|---|
| 4,732,091 A * | 3/1988 | Gould | 110/229 |
| 5,127,344 A * | 7/1992 | Katsui | 110/255 |
| 5,588,378 A * | 12/1996 | Mancini | 110/101 A |
| 5,605,104 A * | 2/1997 | Gross et al. | 110/346 |
| 6,199,492 B1 * | 3/2001 | Kunstler | 110/342 |
| 6,397,764 B1 * | 6/2002 | Massey | 110/194 |
| 6,418,864 B1 * | 7/2002 | Piyasil et al. | 110/342 |
| 6,694,900 B2 * | 2/2004 | Lissianski et al. | 110/345 |
| 7,228,866 B2 * | 6/2007 | Cornelius et al. | 134/166 R |
| 8,528,490 B1 * | 9/2013 | Dueck et al. | 110/229 |
| 2006/0099133 A1 * | 5/2006 | Komatsu | 423/445 R |
| 2007/0234937 A1 * | 10/2007 | Guyomarc'h | 110/248 |
| 2009/0020048 A1 * | 1/2009 | Hunsinger | 110/245 |

OTHER PUBLICATIONS

Hery J; "A complete industrial process to recycle CCA-treated wood," Environmental Impacts of Preservative-Treated Wood, Feb. 8, 2004, pp. 313-322.

International Search Report for PCT/FR2008/050349 dated Sep. 3, 2008.

* cited by examiner

METHOD FOR PRODUCING VEGETABLE CARBON WITH HIGH CARBON CONTENT AND PLANT FOR CARRYING OUT SAID METHOD

CROSS REFERENCE TO RELATED APPLICATIONS

This application is a national stage filing under section 371 of International Application No. PCT/FR2008/050349 filed on Feb. 29, 2008, and published in French on Oct. 2, 2008 as WO 2008/116993 and claims priority of French application No. 0753581 filed on Mar. 1, 2007, the entire disclosure of these applications being hereby incorporated herein by reference.

BACKGROUND ART

The invention is related to the technical sector of production and processing non-food agricultural plant or organic materials to retrieve carbon for recycling.

The applicant has acquired solid expertise and has extensive know-how in the context of carbon production from recovered organic solids. The applicant notably holds many patents filed internationally starting with patents FR No. 2,734,741, No. 2,885,909 and No. 2,888,230. The applicant thus came to use the methods and installations described in these documents to produce carbon in the form of solid elements with very high carbon content.

In the context of his development research, the applicant also became interested in what happens to non-food biomass such as agricultural plant waste, which has a significant carbon content that is usually not used, or barely.

The applicant's application arose from a current de facto situation, which is the use of bioenergies to reduce a country or group of countries' energy dependence on oil. Everyone knows that oil is an energy which, in the coming years, will decrease or even disappear if we consider the ever rising worldwide demand and the reserves which are not inexhaustible. We are therefore turning toward the search for substitution products, and bioenergies are a possible response to this need.

The problem is that bioenergy production largely focuses on grain and oilseed crops which currently are mainly, and even almost exclusively, used for food consumption by populations. These grain and oilseed crops have added value that depends on the market. But if these crops are transferred to other applications such as synthesized bio fuels, there is a risk over time, given the much higher added values, of destabilizing the agri-food market and an impoverishing the potential food supply for the population due to the deficit caused by producing biofuels. Indeed, their production requires considerable crop areas. In other words, if we continue in this direction, we are headed for major antagonistic conflict of interest situations to the detriment of the basic priority of feeding people.

It is therefore in this context that the applicant, given his own knowledge of producing carbon from organic solids, looked into the production of vegetable carbon, i.e. the production of carbonaceous matter from non-food agricultural biomass with a view to then, in an advantageous application, participating in the integration of this carbonaceous matter into the production of synthetic biofuels.

In other words, the applicant's approach was to develop a production method for so-called vegetable carbon from non-food agricultural biomass. There is a considerable volume of non-food agricultural biomass in the world, which is reproduced year after year, creating a nearly inexhaustible source of raw materials without disturbing or exhausting arable land, which is limited.

The transfer of knowledge, notably from the applicant's different previous patents, as indicated above, is not applicable to processing non-food agricultural biomass to obtain vegetable carbon. The research undertaken by the applicant led to the production of so-called vegetable carbon by including other production parameters that are totally inexistent in the aforementioned known technology. It was therefore necessary to implement another method optimized in relation to the prior art with, as a consequence, a different installation.

BRIEF SUMMARY OF INVENTION

According to a first characteristic of the invention, the method is remarkable in that it implements the following phases:

a) priming
   chartherisation, which is the tiered pyrolytic distillation of the biomass corresponding to the organic part of the matter through the circulation of hot gases through the reactor column, with the processed biomass being removed through the base of the reactor, when temperature T2 of the layer of matter above the grid, at the bottom of the reactor, reaches temperature T1, between 350° C. and 400° C., of the gases from the hot gas generator;

b) transition
   air is progressively added in a transition phase to enrich the hot gases from the generator with oxygen, the addition of air being used to oxidize the volatile components located at the bottom of the column on the grid and serving the purpose, firstly, of reducing the temperature of the gases from generator T1 and increasing temperature T2 as well as the quantity of gases due to the oxidation of the organic matter and, secondly, of causing an acceleration in the biomass mineralization process;

c) production
   implementation of the continuous, autonomous vegetable carbon production phase with total substitution of the hot gases from the generator by exclusively adding compressed air at ambient temperature into the base of the column to increase heat transfers between the gases and the biomass in order to obtain vegetable carbon with a high carbon content and to maintain temperature T2 between 600° C. and 700° C. in the biomass layer located just above the grid, while adding compressed air and continuously removing the biomass transformed into vegetable carbon throughout the entire operating process, the whole making it possible to achieve and maintain a constant accelerated production rate by adding biomass into the top of the reactor as the vegetable carbon is removed through the grid at the bottom of the column while maintaining temperature T3 at the top of the column below 65° C.

According to a second aspect of the invention, the installation for implementing the method of the invention of the type comprising the means of implementing the startup and priming phases, including a generator of hot gases with low oxygen content, below, a fan downstream which boosts the hot gases into the lower part of the reactor, said reactor comprising a column of substantial height whose upper inlet is used to continuously load and add biomass and whose lower part has a grid for the support and removal of the load, and an underlying injection chamber for the gas from the generator, and a mechanism for retrieving the processed substances, said installation also including, at the outlet for cold gases at the top of the reaction column, a thermal post-combustion chamber for the extracted gases, a heat exchanger, a fan, a second heat exchanger and a vent, and connecting pipes for recycling the gases with connections between the circuit defined by the components on one side, and the components on the other side, is remarkable in that the installation includes another circuit located between the reactor and the fan which is defined by a compressor unit used to supply pressurized air in the particular production phase and the total replacement of the hot gases from the generator by compressed air at ambient temperature.

Thus, with the method and the installation for carrying it out, we obtain vegetable carbon with high carbon content in the form of pieces, pellets or powder or other similar configurations which can then be used to produce synthetic biofuels, for example.

BRIEF DESCRIPTION OF DRAWING FIGURES

The object of the present invention is described, merely by way of example, in the accompanying drawings in which.

DETAILED DESCRIPTION

In order that the present invention may more readily be understood, the following description is given, merely by way of example, reference being made to the accompanying drawings.

Figure 1:
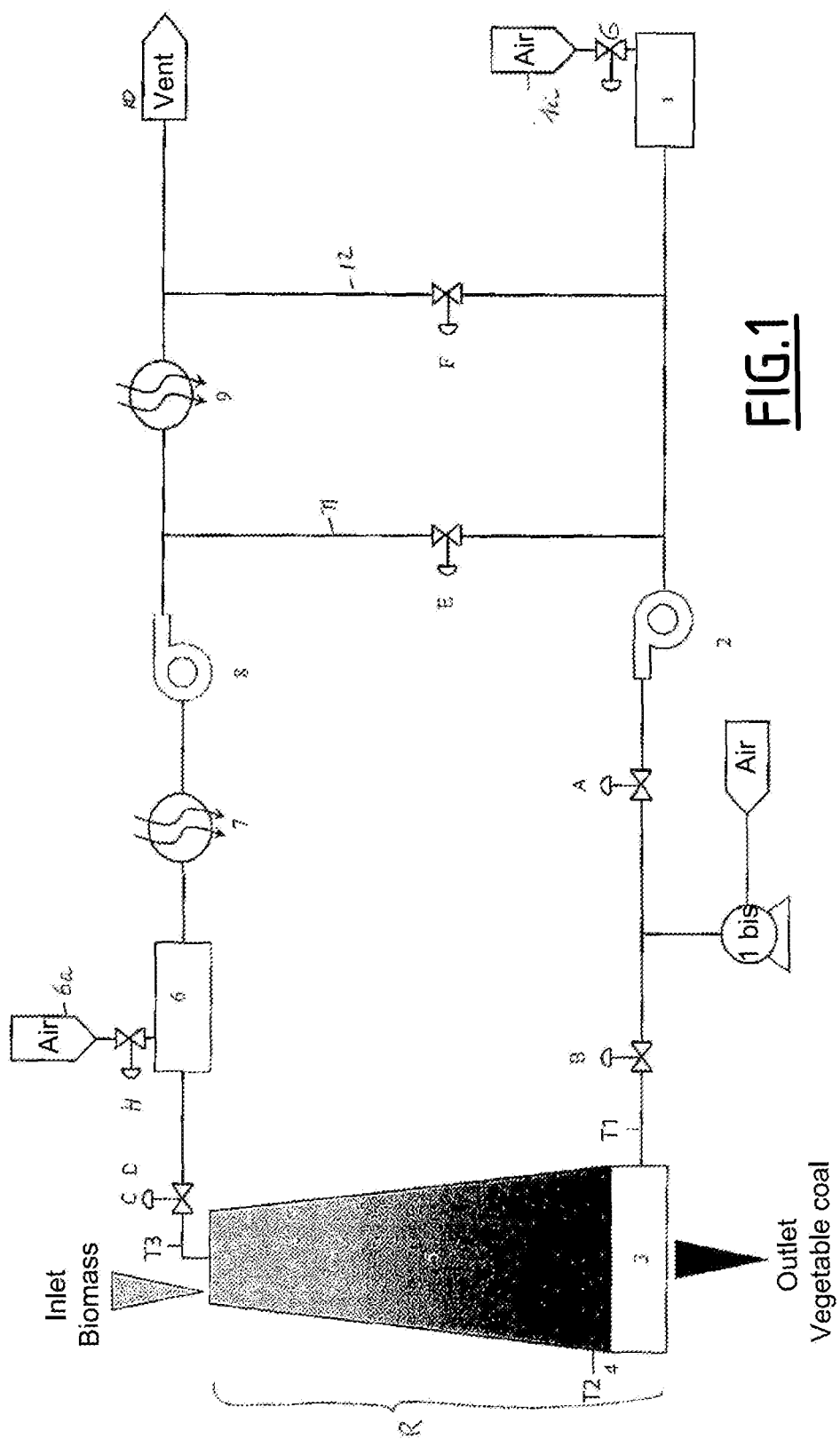
FIG. 1 is a schematic view of the installation for carrying out the method according to the invention for overall implementation.
Figure 2:
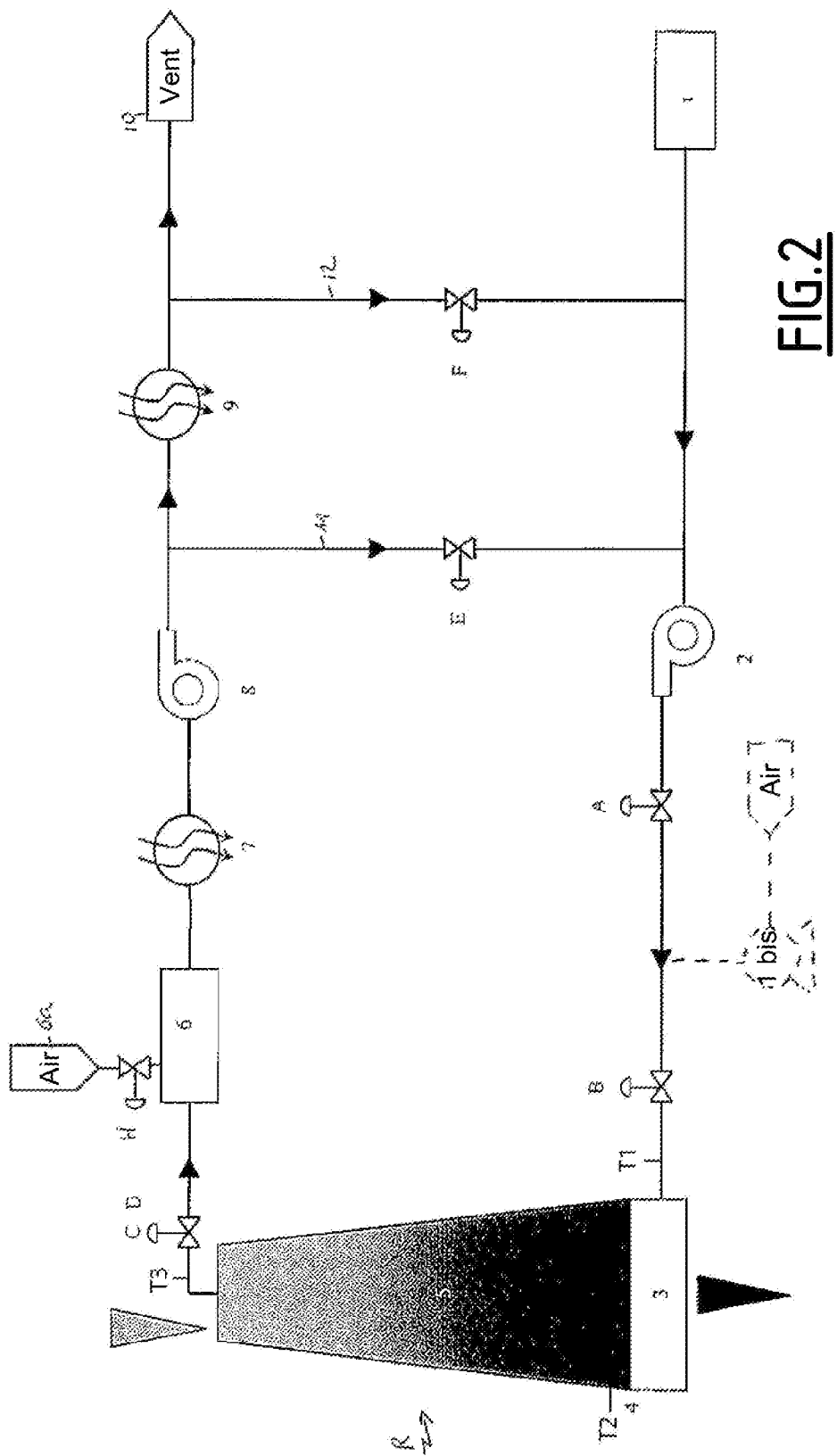
FIG. 2 is a schematic view of the installation, according to FIG. 1, but under operating conditions in the so-called priming phase, in other words "chartherisation".
Figure 3:
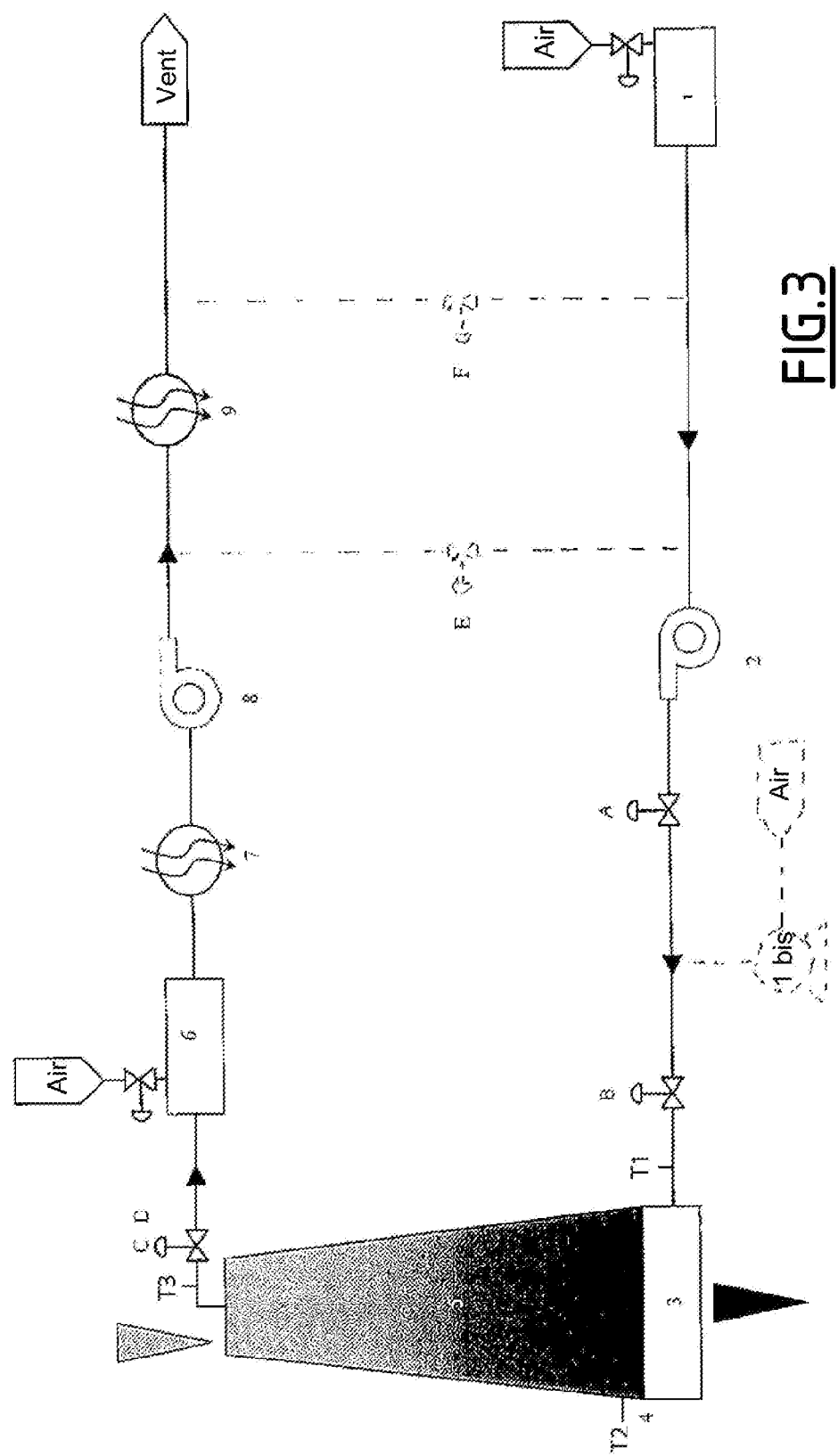
FIG. 3 is a schematic view of the installation, according to FIG. 1, but under operating conditions in the so-called transition phase.
Figure 6:
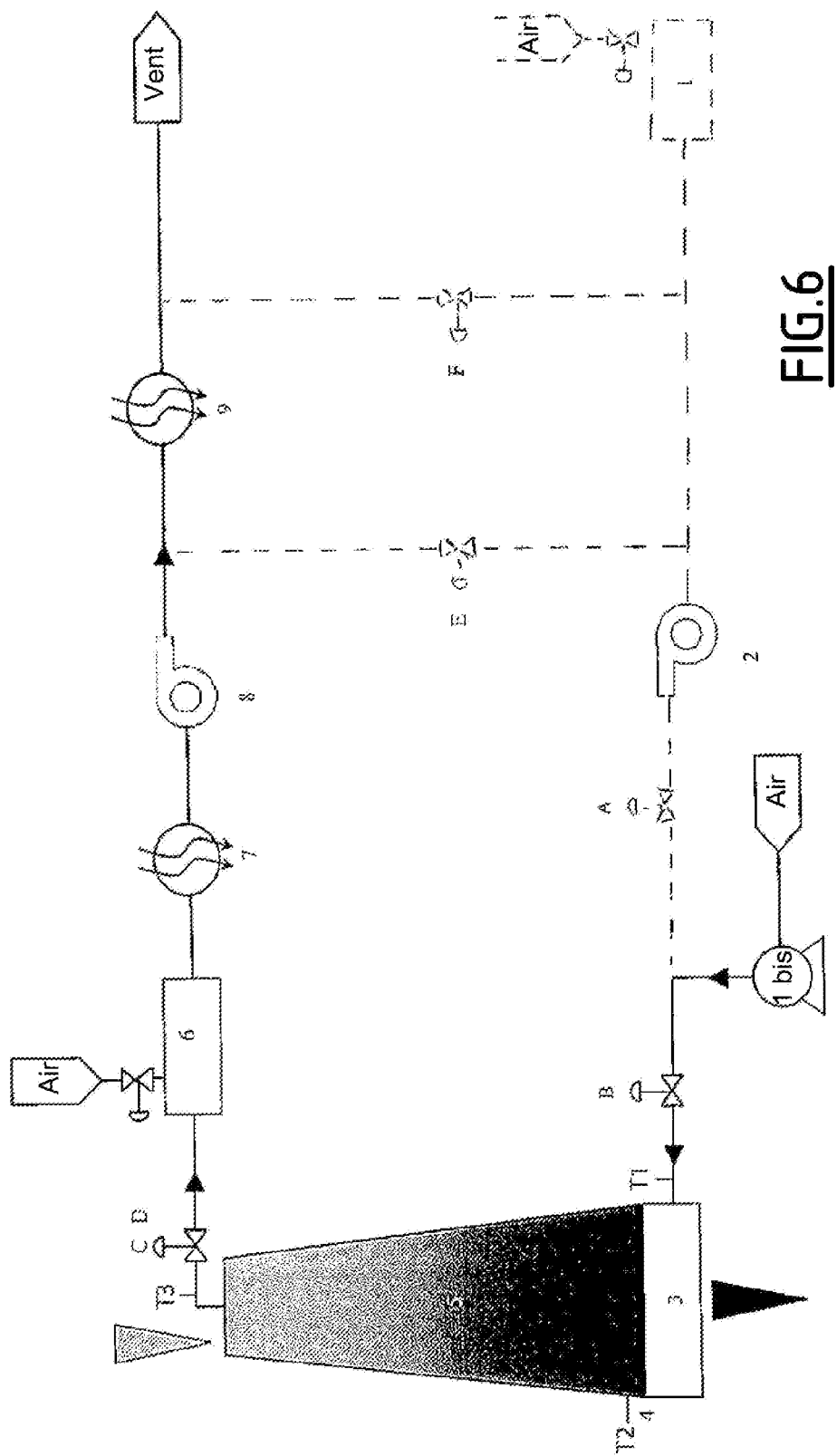
FIG. 6 is a schematic view of the installation, according to FIG. 1, but under production phase operating conditions.

While FIG. 1 represents the entire installation in its overall implementation, FIGS. 2, 3, and 6 illustrate said installation in the different successive phases of operation and the parts of the installation not in operation are illustrated in dotted lines for easier understanding of the invention's operation. We therefore distinguish the initial phases of beginning the installation's operation and those resulting from its complete autonomy illustrated in FIG. 6.

Referring to FIG. 1, for carrying out the initialization of the method, the complete installation for implementing the method includes the following components, identified successively in the direction of gas circulation. The installation comprises a hot gas generator (1) for gases with low oxygen content (approximately 1% $O_2$). This generator is connected to an air inlet (1a) and a control valve (6). Downstream there is a fan (2) which will project a quantity of hot gas into the lower part of the reactor (R) to be determined by the type of biomass being processed. This reactor comprises a column (5) of substantial height whose upper inlet is topped with a hatch for inserting the biomass load to be processed to retrieve the carbon. In the lower section, the reactor has a grid (4), an underlying injection chamber (3) for the gases arriving from the generator (1) and retrieving the vegetable carbon with a high carbon concentration. The reactor column in which the chartherisation process is carried out, as presented below, contains the biomass that has been previously conditioned in terms of size and geometry. The column (5) itself has a specific geometrical profile in the shape of a cylinder with a progressive diameter from the biomass entry part down to the base at the biomass support grid level.

We can then see the other components of the installation from the gas outlet at the top of the reactor column, i.e. a thermal post-combustion chamber (6) for the gases extracted, with an air inlet (6a) controlled by a valve (H), a heat exchanger (7), a fan (8), a heat exchanger (9) and a vent (10). Connecting pipes (11-12) for recycling the gases with, for example, connections between the circuit defined by components (1-2) (8-9) on one side, and components (9-10) (1-2) on the other. The installation according to the invention includes another circuit located between the reactor (R) and the fan (2), comprising a compressor unit (1bis) supplying compressed air in the particular production phase as will be explained below for the method.

Non-food agricultural biomass comes from all types of plants harvested and conditioned beforehand to be inserted into the top of the reactor column using all known means of transfer. Thus, the production method for vegetable carbon with a high carbon content from solid non-food agricultural biomass implements several successive phases, from priming the process to chartherisation, a transition phase, reaching a production phase, which can be maintained continuously for an indefinite period of time, this last phase being the heart of the invention. The method according to the invention used to produce vegetable carbon, compared with the prior art for obtaining carbon from organic solids, includes a new phase after chartherisation, consisting in adding pressurized ambient air from a second air production source in the hot gas injection circuit at the bottom of the reactor column, thus increasing the pressure in the latter in order to accelerate the carbonization phenomenon.

The method for producing vegetable carbon can now be described by referring to the different successive phases of preparation.

The installation is started up and primed with the normal phases of starting up and operating a "chartherisation" installation.

The priming phase of the method is relative to chartherisation, in other words the hot gases from the generator (1) run through the reaction column (1) to extract the organic part of the matter. Once the temperature gradient and the different reactions taking place in the reaction column have stabilized, extraction of the mineralized matter at the bottom of the column begins. Each time temperature T2 of the layer or stratum of plant matter located above the grid (4) equals temperature T1 of the gases from the generator (1), the grid (4) is manipulated using a suitable command to make back-and-forth movements to extract the substances thus processed. Simultaneously, a layer or stratum of biomass is added at the top of the column, which is at a temperature T3 of less than 65° C.

According to FIG. 2, in this phase, the compressor unit (1bis) is not activated and therefore has no effect.

Figure 4:
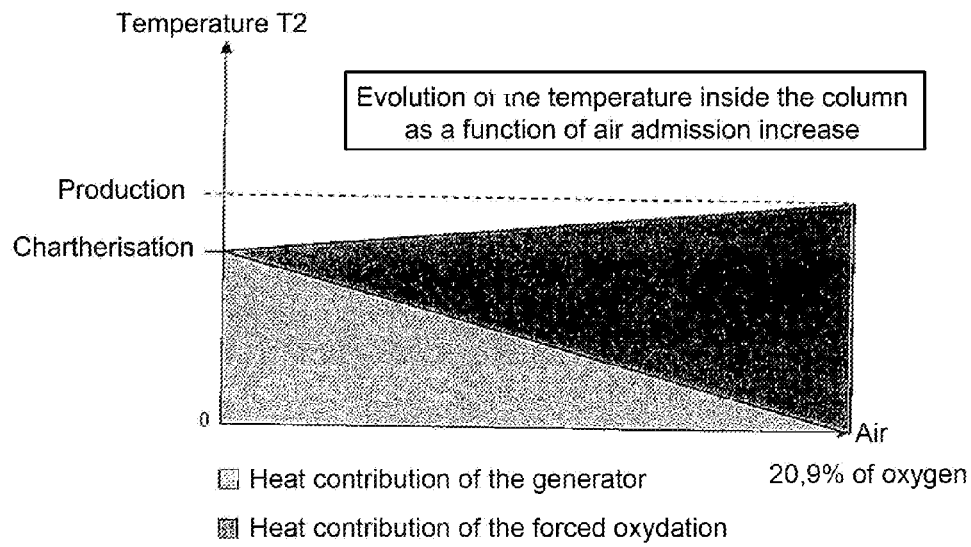
FIG. 4 is a view of a diagram illustrating the rise in temperature T2 in the column related to the increase in ambient air input with the distribution between the heat contribution from the generator and heat support due to forced oxidation.

The next phase of the method consists of a transition phase, which is represented in FIG. 3 and explained by the diagram in FIG. 4. The purpose of this transition phase is to add pressurized ambient air to the hot gases (T1 between 350° C. and 400° C.) from the generator (1). This addition of air reduces temperature T1 and oxidizes the volatile components in the first centimeters of the column just above the grid (4).

This forced oxidation has four consequences, i.e.:
1) Increasing temperature T2 of the stratum just above the grid due to the oxidation of the organic matter. Temperature T2 then rises from a value between 350° C. and 400° C. to a value between 600° C. and 750° C.
2) Accelerating the biomass mineralization process, as the forced oxidation of the organic matter by adding oxygen is a highly exothermic reaction that increases the kinetics of the reaction.
3) Consuming all the oxygen present in the injection gases.
4) Progressively reducing the temperature of the injection gases as the proportion of air in the hot gases increases. Temperature T1 drops from a value between 350° C. to 400° C. to the ambient temperature.

The diagram in FIG. 4 shows the temperature reaction in the stratum above the grid in relation to the addition of oxygen inherent to the additional air initiated by air inlet (1a). As soon as the additional air is added, T2 changes from the chartherisation temperature to the production temperature. We can see that the heat contribution due to the hot gases from the generator (1) tends to decrease proportionally as the heat contribution due to forced oxidation develops.

According to FIG. 1, the compressor (1bis) has not been activated and has no effect.

Figure 5:
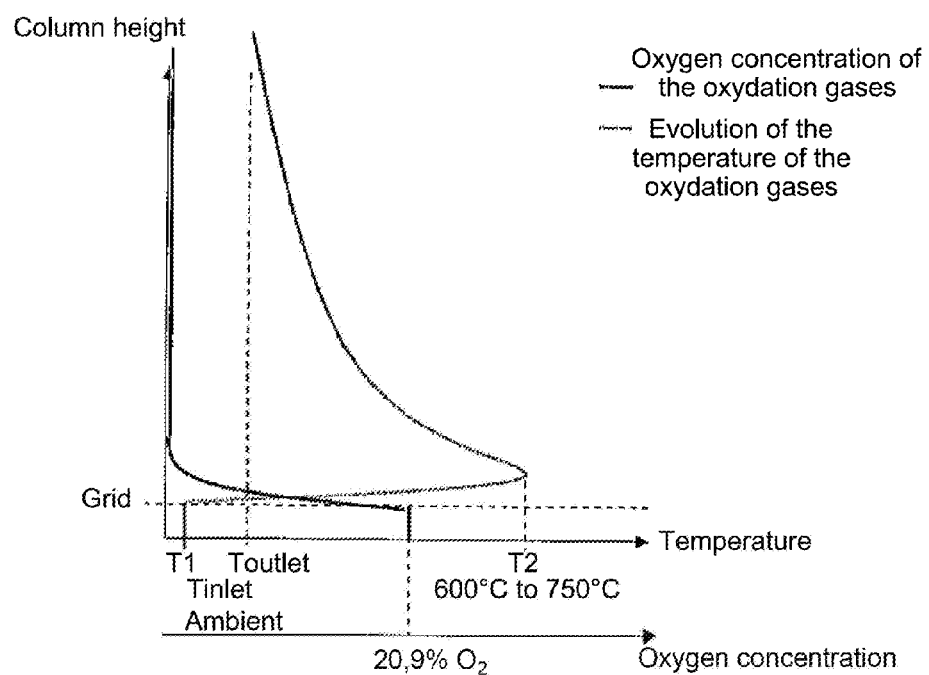
FIG. 5 is a diagram in relation to the height of the column and the temperature, showing the curves for oxygen concentrations and temperature changes.

The diagram represented in FIG. 5 shows the curves for the oxygen concentration (C1) and the change in temperature (C2) as a function of the height of the reactor column.

Thus, after crossing the grid (4) and the first centimeters of the matter, the gases heat up and lose oxygen. As they continue upward, the gases in contact with the matter having totally lost the oxygen they contained continue to transfer heat as they rise in the reactor column. This heat transfer causes the extraction of the organic part and the aqueous part of the biomass, thus causing carbonization.

During this phase, the vegetable carbon obtained is removed to the chamber (3) by activating the grid (4), while the temperature of the gases from the generator, T1, progressively decreases and when the temperature of the injection gases reaches the ambient temperature, the following phase of the method begins, i.e. the production phase, which consists in replacing the gas from the generator with compressed air.

According to FIG. 3, the compressor (1bis) is not activated and has no effect.

The next phase of the method is the production phase. It is illustrated in FIG. 6 and corresponds to the startup of the compressed air generator (1bis) with an injection of compressed air, which replaces the hot gas generator (1) operations.

The amount of oxygen injected into the column (5) is increased by raising the compressed air pressure. The air supply circuit therefore changes as can be seen in FIG. 6, with the hot gas generator (1) being replaced by an air compressor. This continuous injection of compressed air can raise the pressure to 5 bars at the bottom of the column in a context of continuous reactor operation. The effect of this pressurization is to increase the density of the milieu and therefore to increase heat transfers between the gases and the biomass, thus encouraging condensation on the upper strata of the heavy organic matter from the lower strata of the column.

The vegetable carbon thus produced is removed through the collection chamber (3).

In the context of continuous operations and vegetable carbon production, different means and parameters are used to control the method and mineralization quality. Checks are made on the quantity of air injected, temperature setting T2 for triggering movement, the pressure of the compressed air injected and the pressure of the gases at the bottom of the column.

Controlling combustion and maintaining the temperature below the T2 setting are ensured by continuous control of the grid movement to remove the vegetable carbon, thus avoiding over-gasification of the carbon.

In other words, once the initial operation phases of chartherisation and transition are completed, the installation is in an autogenous production situation to obtain vegetable carbon. This suggests that there is a combination of continuous removal of the carbonaceous substances in the form of vegetable carbon and filling of the reactor from the top with a corresponding quantity of biomass for processing in a continuous cycle. This also suggests that the system is self-supplying, maintaining and controlling the temperatures, notably for the biomass part located just above the grid (4) and corresponding to the stratum that is in the final phase of vegetable carbon production.

The method according to the invention, compared with the prior art, therefore now calls for the progressive addition of new air mixed with the hot gases until the temperature of the gases is reduced in order then to switch into an autonomous, continuous vegetable carbon production phase by adding air compressed to a certain pressure coming from another source. The substances obtained according to the method in the invention have very high carbon content and can then be used to produce biofuels.

The invention is therefore of immediate interest in that it makes use of non-food agricultural biomass of all kinds which, by definition, is always available and is not linked to market phenomena, and in that it provides the constituent substances of vegetable carbon for applications such as biofuel synthesis.

Another interest of the invention lies in the fact that, once production has been established, the hot gas generator (1) is disconnected from the installation's operations, which reduces the energy costs related to its operation and the production installation is autogenous.

Carbon production from non-food agricultural biomass provides considerable substances for the production of energy by using this vegetable carbon in many direct or indirect applications, such as the production of biofuels, not to mention for the environment itself.

The invention claimed is:
1. A method for producing vegetable carbon with high carbon content from non-food agricultural biomass introduced at an upper inlet into a reactor column, comprising the following phases performed in sequence in an operating process:
(a) priming phase, comprising the steps of:
tiered pyrolytic distillation of the biomass through injection of hot gases at a temperature between 350° C. and 400° C. into a lower part of the reactor column through a grid supporting the biomass, and
removing processed biomass from the lower part of the reactor column when a temperature of a biomass layer just above the grid reaches the temperature of the injected gases;
(b) transition phase, comprising the steps of:
progressively adding air to the injected gases to enrich with oxygen, oxidizing volatile components located on the grid with the oxygen to increase the temperature of the biomass layer just above the grid, and accelerate biomass mineralization; lowering the temperature of the injected gases into the lower part of the reactor column with the added air; and (c) production phase, including the steps of:

when the temperature of the injected gases reaches ambient temperature, replacing the oxygen enriched gases exclusively with compressed air, continuously injecting the compressed air into the lower part of the reactor column through the grid to increase heat transfer between the gases and the biomass to obtain vegetable carbon with high carbon content and to maintain the temperature in the biomass layer just above the grid between 600° C. and 750° C., removing biomass transformed into vegetable carbon from the lower part of the reactor column through the grid, and adding non-food agricultural biomass through the upper inlet to the reactor column as the vegetable carbon is removed from the lower part of the reactor column through the grid while maintaining temperature at a top of the reactor column below 65° C.

2. The method as claimed in claim 1, further comprising: implementing the priming phase with a generator of the hot gases, and a first fan downstream which boosts the hot gases into the lower part of the reactor, said reactor comprising a column of substantial height with an upper inlet to continuously load and add biomass, a grid in the lower part for support and removal of the processed biomass, and an underlying injection chamber for the injected gases, and further employing a mechanism for retrieving processed biomass, an outlet for cold gases at a top of the reaction column, a thermal post-combustion chamber for extracted gases, a heat exchanger, a second fan, a second heat exchanger, a vent and connecting pipes for recycling the gases with connections between a circuit defined by components on one side, and components on another side, and further employing another circuit located between the reactor column and the first fan, the another circuit including a compressor unit to supply the compressed air in the production phase and total replacement of the hot gases from the generator by the compressed air at ambient temperature.

3. The method of claim 1 wherein, in the priming phase, the hot gasses injected into the lower part of the reactor column contain approximately 1% oxygen.

4. The method of claim 1, further including: employing the removed vegetable carbon to synthesize biofuel.

* * * * *